(12) United States Patent
Adachi et al.

(10) Patent No.: US 12,222,845 B2
(45) Date of Patent: Feb. 11, 2025

(54) APPARATUS, METHOD, AND PROGRAM FOR GENERATING A TEST SCRIPT FOR A WEB APPLICATION BASED ON SCREEN TRANSITIONS

(71) Applicant: NIPPON TELEGRAPH AND TELEPHONE CORPORATION, Tokyo (JP)

(72) Inventors: Yu Adachi, Tokyo (JP); Haruto Tanno, Tokyo (JP); Hiroyuki Kirinuki, Tokyo (JP); Yu Yoshimura, Tokyo (JP); Toshiyuki Kurabayashi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 48 days.

(21) Appl. No.: 17/601,885

(22) PCT Filed: Apr. 6, 2020

(86) PCT No.: PCT/JP2020/015559
§ 371 (c)(1),
(2) Date: Oct. 6, 2021

(87) PCT Pub. No.: WO2020/209227
PCT Pub. Date: Oct. 15, 2020

(65) Prior Publication Data
US 2022/0214963 A1    Jul. 7, 2022

(30) Foreign Application Priority Data
Apr. 9, 2019   (JP) .................................. 2019-074376

(51) Int. Cl.
G06F 11/36       (2006.01)

(52) U.S. Cl.
CPC ...... *G06F 11/3684* (2013.01); *G06F 11/3664* (2013.01)

(58) Field of Classification Search
CPC .......... G06F 11/36–3696; G06F 9/451; G06F 11/302; G06F 11/32–34; G06F 11/3447
See application file for complete search history.

(56) References Cited

U.S. PATENT DOCUMENTS 8,239,835 B2 *  8/2012  Rex ..................... G06F 11/3688
                                                                717/127
8,949,795 B2 *  2/2015  Chandra ............. G06F 11/3684
                                                                717/124
(Continued)

FOREIGN PATENT DOCUMENTS

| JP | 2012133721 A | 7/2012 |
| JP | 201710088 A | 1/2017 |
| JP | 2018116496 A | 7/2018 |

OTHER PUBLICATIONS

Kurabayashi et al. (2017) "Automatic Test Script Generation on GUI Testing" Software Engineering Symposium 2017 Proceedings, pp. 260-264.

*Primary Examiner* — Todd Aguilera (57) ABSTRACT

An apparatus and a method relate to generating a test scenario for testing a web application. The disclosure includes executing a script that causes a transition of a screen to a reference screen of the web application. From the reference screen, the disclosure dynamically performs a screen transition analysis for subsequent screens that are transitioned from previous screens of the web application. The subsequent screens for the dynamically performing the screen transition analysis are within a boundary according to a predetermined number of hops from the reference screen. The screen transition analysis includes automatically generating a test scenario and input data for causing screen
(Continued)

transitions in the web application. Based on the screen transitions, the screen transition analysis generates screen transition data diagram for testing the web application.

12 Claims, 8 Drawing Sheets

(56) References Cited

U.S. PATENT DOCUMENTS

| | | | |
|---|---|---|---|
| 10,783,061 B2 * | 9/2020 | Paul | G06F 11/3688 |
| 12,001,324 B2 * | 6/2024 | Yoshimura | G06F 11/3688 |
| 2008/0282231 A1 * | 11/2008 | R | G06F 11/3688 |
| | | | 717/124 |
| 2012/0167059 A1 | 6/2012 | Kosuda | |
| 2014/0059522 A1 * | 2/2014 | Chandra | G06F 11/3684 |
| | | | 717/126 |
| 2019/0391906 A1 * | 12/2019 | Paul | G06F 11/3676 |

* cited by examiner

```
<PSEUDO-CODE (CORRESPONDING TO FLOWCHART)>
1:  execute script for reaching reference screen;        ⎫ POINT 1
2:  subject screen = reference screen;                   ⎫ POINT 2
3:  number of hops to subject screen = 0;
4:  store subject screen onto screen stack();
5:  while(screen stack is not empty){
6:    subject screen = one popped from screen stack;
7:    group of actions causing transition = acquire group of actions causing transition on subject screen;
8:    foreach(action causing transition in group of actions causing transition){
9:      next screen = preliminary procedure + acquire new screen by operation for action causing transition();
10:     number of hops to next screen = number of hops to subject screen + 1;   ⎫ POINT 2
11:     if(number of hops to next screen <= upper limit of number of hops){
12:       push next screen onto screen stack;
13:     }
14:   }
15: }
```

APPARATUS, METHOD, AND PROGRAM FOR GENERATING A TEST SCRIPT FOR A WEB APPLICATION BASED ON SCREEN TRANSITIONS

CROSS-REFERENCE TO RELATED APPLICATIONS

This application is a U.S. 371 Application of International Patent Application No. PCT/JP2020/015559, filed on 6 Apr. 2020, which application claims priority to and the benefit of JP Application No. 2019-074376, filed on 9 Apr. 2019, the disclosures of which are hereby incorporated herein by reference in their entireties.

TECHNICAL FIELD

The present invention relates to an analysis apparatus, an analysis method, and a program.

BACKGROUND ART

In recent years, there have been increasing development styles in which software development is conducted at a short-term cycle and services are frequently released, in order to quickly provide services that meet diversifying consumer needs. In association with the short-cycle provision of services, frequency of software testing to confirm normality of software operation has also been increasing.

In the software testing, functional testing is performed that checks whether or not a web application under test works as intended by a designer. It has been addressed as a problem that an enormous amount of time is consumed by a test related to screen transition (transition of web pages) (hereinafter, referred to as "screen transition test"), among functional tests. Here, the screen transition test is defined as a "test to check whether or not a web application is implemented in conformity with specifications, based on each screen displayed on a client side in response to an interaction from the client side".

A reason why the screen transition test requires time is that manual operations are needed for interactions from the client side, such as operations of clicking a link and a button on a screen, and inputting an appropriate value in an input form. Since such operations are repeatedly performed on all screens, an enormous amount of time is required, and labor saving is needed.

For a method for reducing the time required for the screen transition test, a method has been known in which the screen transition test is automatically performed by writing test cases in scripts. However, since work of creating test scripts itself also takes time, it is said that an effect of the work time spent is not brought about unless automated testing using the created test scripts is performed three or more times. Moreover, since the created test scripts become unable to be used when a change is added to existing functionality, it is necessary to recreate test scripts each time specifications are changed.

To overcome such problems, a reverse-based automatic test script generation technique (hereinafter, referred to as "reverse-based testing technique") has been devised in which specification information is reconstructed by analyzing source code of a web application under test, and a test script is automatically generated from the reconstructed specification information (see Non-Patent Literature 1).

CITATION LIST

Non-Patent Literature

Non-Patent Literature 1: Toshiyuki Kurabayashi, Muneyoshi Iyama, Hiroyuki Kirinuki, and Haruto Tanno: "Automatic Test Script Generation on GUI Testing", Software Engineering Symposium 2017, Special issue of papers, pp. 260-264, September 2017

SUMMARY OF THE INVENTION

Technical Problem

As described above, the reverse-based testing technique is a method for automatically generating test scripts, by reversely exploring specifications while dynamically analyzing screens of a web application under test, and then generating exhaustive test cases. With this technique, automation of the screen transition test can be achieved, without requiring manual work of creating test scripts.

However, the reverse-based testing technique has a drawback that since specifications are explored reversely while all screen elements (buttons, links, and the like) included in the screens of the web application are automatically operated in mechanical and exhaustive manners, the exhaustive screen transition test reconstructs the specifications including even specification information that is not necessarily required for the exhaustive screen transition test, and generates such specification information as a test script.

As a result, a problem arises that a merit of the automatic test script generation is impaired because an amount of time required for specification reconstruction increases, and unnecessary information is mixed in with generated test scripts.

The present invention has been made in view of the above-described problem, and an object of the present invention is to provide, in the reverse-based testing technique, a technique that can prevent exhaustive specification reconstruction from causing an increase in time spent on the specification reconstruction.

Means for Solving the Problem

According to a disclosed technique, an analysis apparatus is provided that includes: script execution means for executing a script that causes a transition of a screen displayed by a web application, to a reference screen; and analysis means for performing screen transition analysis for the web application, within a boundary that the number of hops for screen transitions from the reference screen is equal to or smaller than a preset upper limit value.

Effects of the Invention

According to the disclosed technique, in the reverse-based testing technique, a technique is provided that can prevent exhaustive specification reconstruction from causing an increase in time spent on the specification reconstruction.

DESCRIPTION OF EMBODIMENT

Hereinafter, an embodiment (present embodiment) of the present invention will be described with reference to drawings. The embodiment described below is only an example, and embodiments to which the present invention is applied are not limited to the embodiment described below.

Outline of Embodiment

The present embodiment is based on a dynamic analysis technique in the existing reverse-based testing technique described in Non-Patent Literature 1. Based on this base technique, a client apparatus 10, which will be described later, performs processing, basically, in the following steps:

(1) Analyzing a web application under test, and extracting a connection between screens and means for reaching each screen included as specifications in the test subject;

(2) Generating a screen transition diagram suitable for a screen transition test in functional testing, from the specifications acquired in (1); and (3) Outputting a test script corresponding to each transition in the screen transition diagram generated in (2), according to a script format desired for output, based on information on the means for reaching each screen extracted in (1).

As described earlier, in the existing reverse-based testing technique, specifications are explored reversely while all screen elements (button, link, and the like) included in screens of a web application are automatically operated in mechanical and exhaustive manners. Accordingly, the problem has been addressed that the exhaustive screen transition test reconstructs the specifications including even specification information that is not necessarily required for the exhaustive screen transition test, and generates such specification information as a test script.

Figure 1:
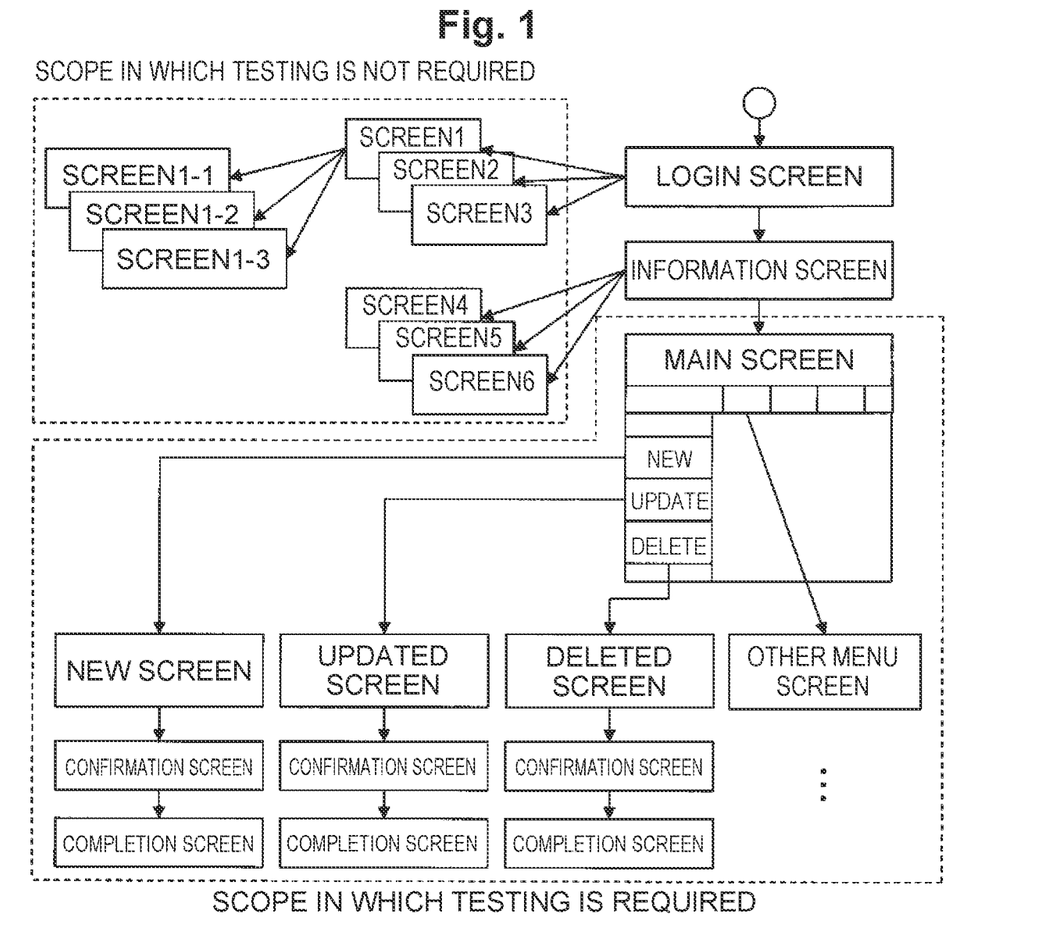
FIG. 1 is a diagram for describing a scope in which testing is not required.

An example in a case where an exhaustive screen transition test is not required will be described with reference to FIG. 1. The example shown in FIG. 1 shows an example in a case where a main screen after login, among various screens displayed on a client by a web application, is used for a reference, and a test focusing on transitions from the main screen is desired to be performed ("scope in which testing is required" in FIG. 1).

With respect to the other screens ("scope in which testing is not required" in FIG. 1), it is important to avoid specification reconstruction in order to reduce time. To this end, it is necessary to take into consideration, for example, a case where the main screen may include a "logout" button, and to avoid a situation where pressing of the button causes a transition to a login screen and, consequently, even the scope in which testing is not required is unlimitedly analyzed.

Figure 2:
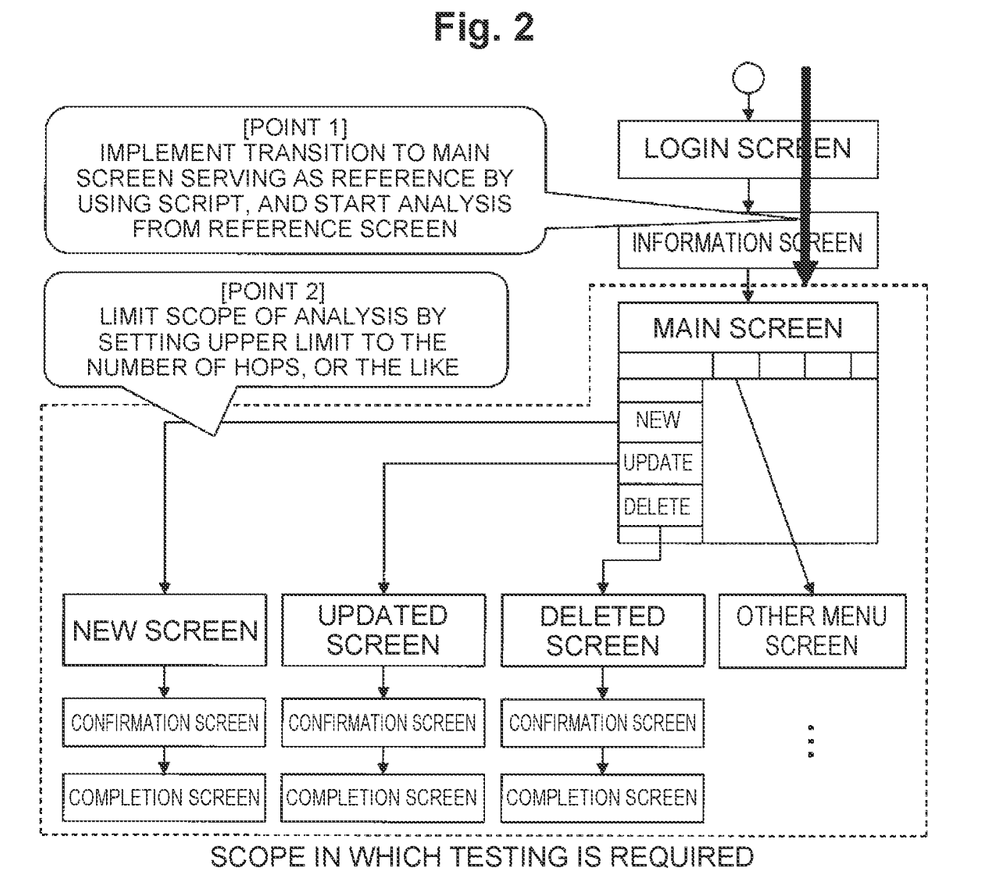
FIG. 2 is a diagram for describing an outline of an embodiment of the present invention.

FIG. 2 shows points of the technique for making it possible to avoid specification reconstruction with respect to the scope in which testing is not required. As shown in FIG. 2, in the present embodiment, as point 1, a transition to the main screen serving as the reference is implemented by a script executed by the client, and analysis is started from the reference screen. As point 2, a scope of analysis is limited by setting an upper limit to the number of hops for screen transitions. Hereinafter, the technique according to the present embodiment will be described in more detail.

(System Configuration)

Figure 3:
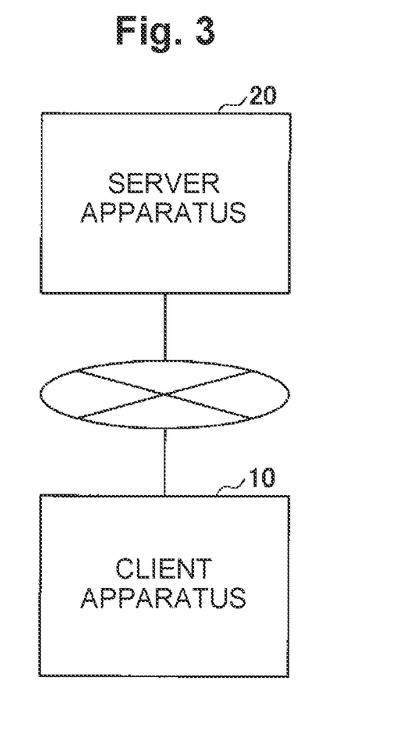
FIG. 3 shows an example of a system configuration in the embodiment of the present invention.

FIG. 3 shows an example of a system configuration in the embodiment of the present invention. In FIG. 3, a server apparatus 20 and the client apparatus 10 are connected, for example, through a network such as a LAN (Local Area Network) or the Internet.

The server apparatus 20 is one or more computers that include a system under test including a web application.

The client apparatus 10 is an apparatus that analyzes the web application included in the server apparatus 20 and generates a test script. The client apparatus 10 may be referred to as "analysis apparatus". The web application under test may be included in the client apparatus 10, not in the server apparatus 20.

Figure 4:
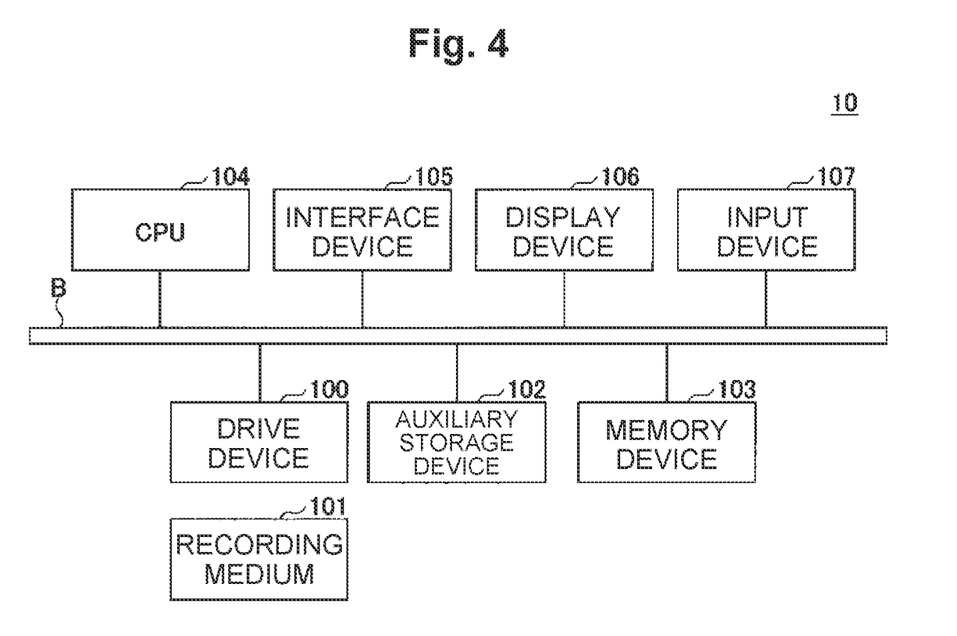
FIG. 4 shows an example of a hardware configuration of a client apparatus 10 in the embodiment of the present invention.

FIG. 4 shows an example of a hardware configuration of the client apparatus 10 in the embodiment of the present invention. As shown in FIG. 4, the client apparatus 10 can be implemented as a computer.

The client apparatus 10 (computer) in FIG. 4 includes a drive device 100, an auxiliary storage device 102, a memory device 103, a CPU 104, an interface device 105, a display device 106, an input device 107, and the like, each of which is mutually connected through a bus B.

A program that implements processing in the client apparatus 10 is provided by using a recording medium 101 such as a CD-ROM. When the recording medium 101 storing the program is set in the drive device 100, the program is installed from the recording medium 101 into the auxiliary storage device 102 via the drive device 100. However, the program does not necessarily need to be installed from the recording medium 101 and may be downloaded from another computer via a network. The auxiliary storage device 102 stores the installed program, and also stores a required file, data, and the like.

When an instruction to activate the program is given, the memory device 103 reads the program from the auxiliary storage device 102 and stores the program. The CPU 104 implements functionality involved with the client apparatus 10, in accordance with the program stored in the memory device 103. The interface device 105 is used for an interface for connecting to the network. The display device 106 displays a GUI (Graphical User Interface) and the like implemented by the program. The input device 107 includes a keyboard, a mouse, and the like, and is used for allowing various operational instructions to be inputted.

Figure 5:
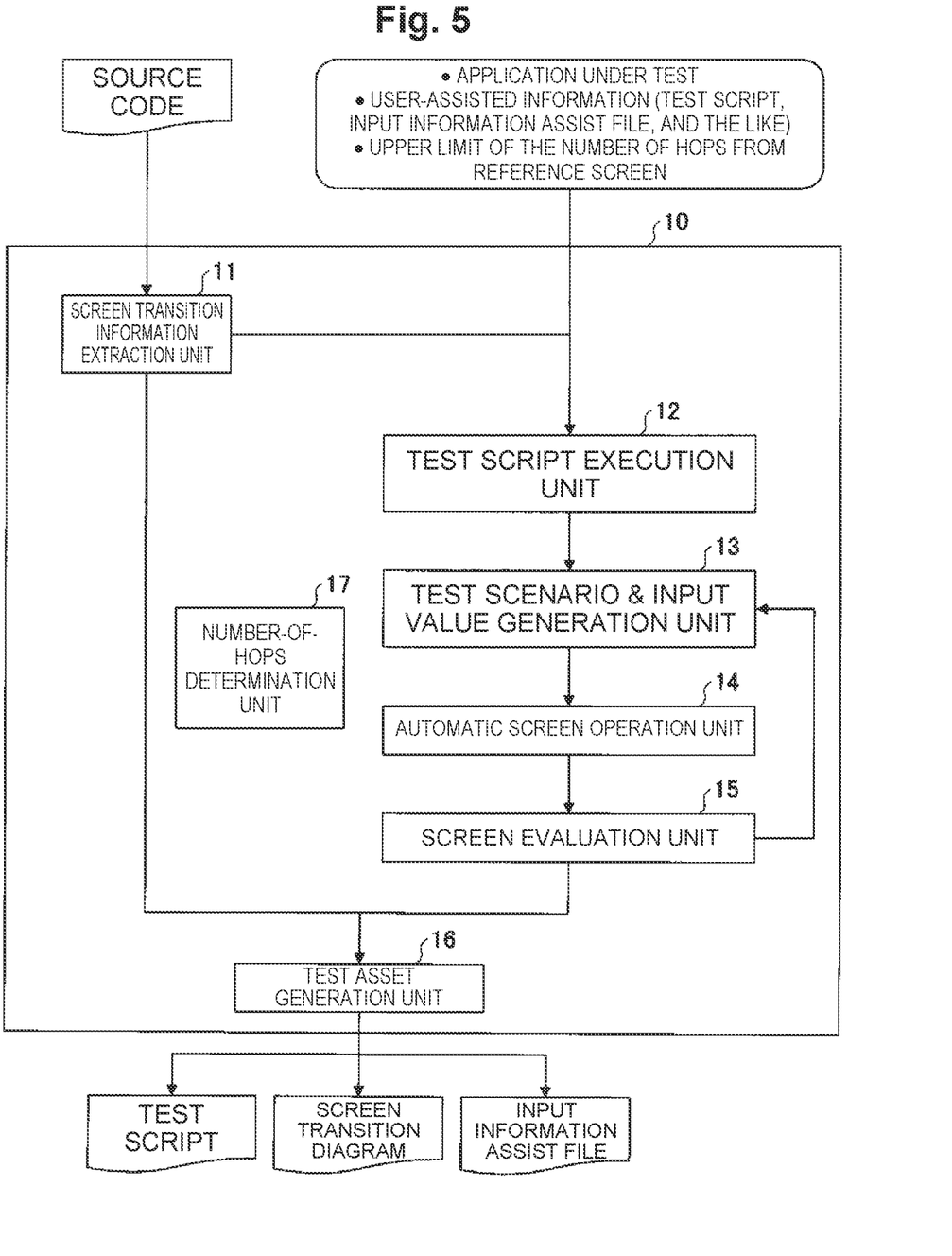
FIG. 5 shows an example of a functional configuration of the client apparatus 10 in the embodiment of the present invention.

FIG. 5 shows an example of a functional configuration of the client apparatus 10 in the embodiment of the present invention. In FIG. 5, the client apparatus 10 includes a screen transition information extraction unit 11, a test script execution unit 12, a test scenario & input value generation unit 13, an automatic screen operation unit 14, a screen evaluation unit 15, a test asset generation unit 16, and a number-of-hops determination unit 17. The units are implemented through processing that one or more programs installed in the client apparatus 10 cause the CPU 104 to execute.

The screen transition information extraction unit 11 analyzes a controller of a web application under test by using a static analysis technique, based on source code of the controller, and acquires, as screen transition information, information indicating the number of transition destinations corresponding to each request.

The test script execution unit 12 executes, on the web application under test, a test script that describes a scenario to reach the reference screen, and sets the reached screen as an initial URL.

The test scenario & input value generation unit 13 generates a test scenario and a test input value, for each screen displayed in the test. A test input value to be inputted into each form on a screen of interest is generated by using peripheral information on the form in an HTML DOM tree for the screen of interest.

The automatic screen operation unit 14 implements dynamic analysis, by automatically performing screen operations by using the generated test scenario and test input value as a test case, within a boundary that the number of hops is equal to or smaller than an upper limit value. Determination as to whether or not the number of hops is equal to or smaller than the upper limit value is performed by the number-of-hops determination unit 17.

The screen evaluation unit 15 determines whether or not a screen to which a transition is made by performing a screen operation is an already explored screen, by using information such as URL and HTML. The screen evaluation unit 14 performs editing processing for abstracting each of HTML data of the screen to which a transition is made by performing a screen operation and HTML data of the already explored screen, and then compares the respective edited HTML data.

The test asset generation unit 16 generates a screen transition diagram, based on the information acquired through the static analysis and the dynamic analysis. Moreover, the test asset generation unit 16 outputs the test scenarios and the test input values generated by the test scenario & input value generation unit 13, in a test script format.

(Example of Overall Actions of the Client Apparatus 10)

Figure 6:
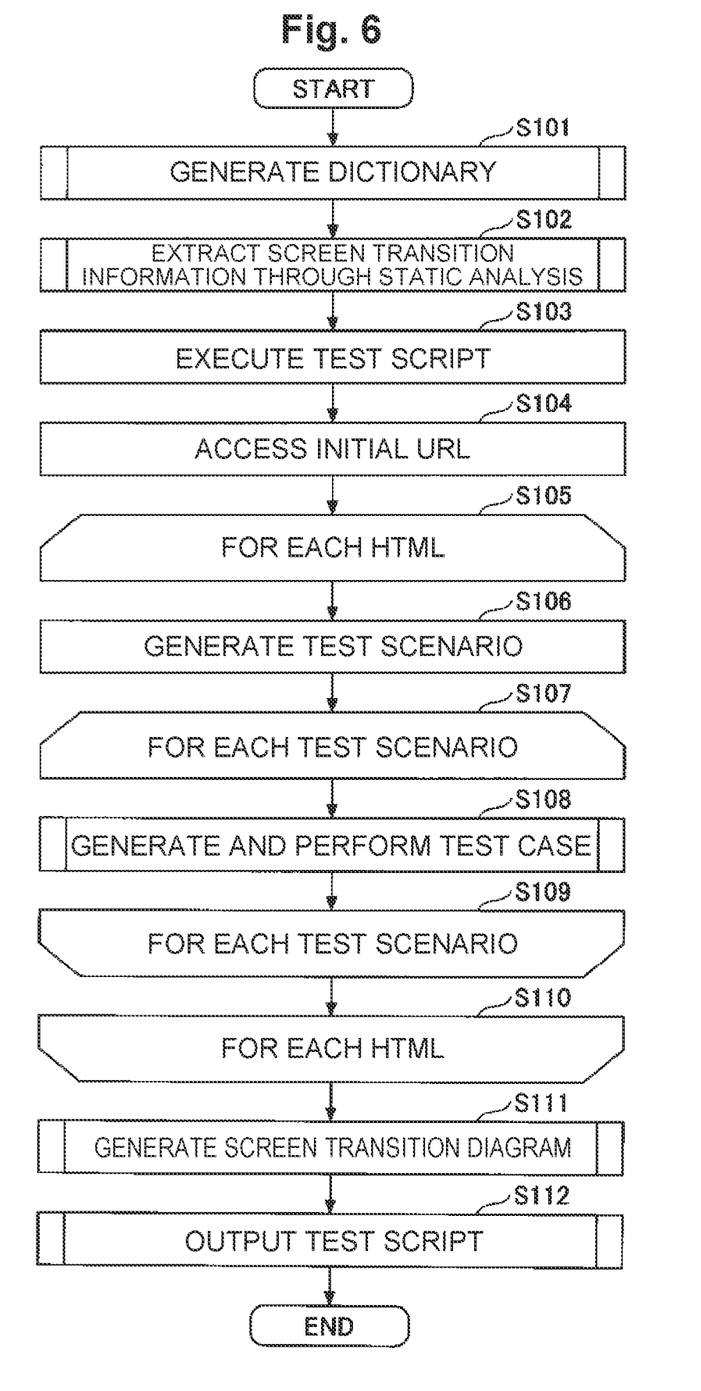
FIG. 6 is a flowchart for describing an example of overall actions of the client apparatus 10.

Hereinafter, an example of a processing procedure performed by the client apparatus 10 will be described. FIG. 6 is a flowchart for describing the example of the processing procedure performed by the client apparatus 10. In FIG. 6, a description will be given mainly of overall actions until test scripts are outputted, in the functional configuration in FIG. 5.

Prior to the actions described below, the client apparatus 10 receives as inputs: source code of the web application under test; the test script describing the scenario from a screen of an initial URL of the web application (for example, the login screen in FIG. 2) until the reference screen (for example, the main screen in FIG. 2) is reached; the upper limit value of the number of hops from the reference screen; and the like.

In step S101, the test scenario & input value generation unit 13 generates a dictionary that is used in generation of a test input value. The dictionary is data with a structure in which to each word, a hypernym of the word is assigned as a tag. In the present embodiment, for example, two types of dictionaries are used, that is, a dictionary prepared beforehand, and a dictionary generated from DB data accessed by the web application in the server apparatus 20. In step S101, the latter dictionary is generated. By using a value registered in the DB for a test input value, a transition can be made to a screen, such as a search display screen, to which a transition cannot be made unless a test input value registered in the DB is used. A user can generate a test input value even if the DB data is not given for an input, but when the DB data is not given for an input, there is a possibility that an appropriate input value cannot be generated if the data registered in the DB has an influence on a condition for a screen transition.

Subsequently, the screen transition information extraction unit 11 analyzes the source code of the controller by using the static analysis technique, and acquires the number of transition destinations corresponding to each request, from information on the controller that determines a transition destination of a screen (S102). Information indicating the number of transition destinations corresponding to one request is referred to as "screen transition information", and a list of such screen transition information is referred to as a "screen transition information list".

Subsequently, in S103, the test script execution unit 12 executes the test script describing the scenario in which a screen displayed on the client apparatus 10 by the web application under test reaches the reference screen from the screen of the initial URL. Here, a URL of the reached reference screen is set as an "initial URL" thereafter.

Subsequently, the automatic screen operation unit 14 accesses the initial URL (the above-mentioned reference screen) and acquires HTML data and the like corresponding to the initial URL (S104). As a result, a screen based on the HTML data and the like is displayed on the display device 106.

In subsequent steps S105 to S110, dynamic analysis and the like are performed on the HTML data corresponding to the initial URL, and on HTML data to which a transition is made starting from the screen based on the HTML data corresponding to the initial URL. However, transitions are performed within the boundary that the number of hops from the reference screen (initial URL) is equal to or smaller than the upper limit value, and a transition is not performed when the number of hops exceeds the upper limit value.

Specifically, an operation of each screen under test (an operation for an action) is actually automatically performed as dynamic analysis by the automatic screen operation unit 14, starting from the screen corresponding to the initial URL, such that all transition destinations corresponding to each request acquired through the static analysis are covered. In the dynamic analysis, for example, all links on each screen are clicked. When an input form and a corresponding submit button are present, a test input value is generated and a screen operation is performed repeatedly with respect to a request executed when the submit button is pressed, until the number of transition destinations corresponding to the request, which is acquired through the static analysis, is satisfied. As to whether or not the number of transition destinations corresponding to the request is satisfied, the number of reached screens is counted by comparing a transition-destination screen with each already explored screen and then determining whether or not the transition-destination screen is a screen newly explored. Through the dynamic analysis as described above, the client apparatus 10 acquires information on the transition-destination screens (HTML, URL, and the like), connections between the screens, and means for reaching each screen. Moreover, when a screen transition that does not pass through the controller is discovered by the dynamic analysis, information on the screen transition is also added. The screen transition that does not pass through the controller is, for example, a screen transition occurring when a link defined by an <a> tag is clicked.

Hereinafter, HTML data being processed in steps S105 to S110 will be referred to as the "subject HTML".

In step S106, the test scenario & input value generation unit 13 generates a test scenario for a screen according to the subject HTML (hereinafter, referred to as the "subject screen"). In other words, for each screen element (a link, a submit button, and the like) causing a screen transition on the subject screen, a test scenario including a pair of an operation and a locator is generated. The operation is a clicking operation or the like. The locator is identification information on the screen element to be operated.

Subsequent steps S107 to S109 are performed for each of the test scenarios generated in step S106. Hereinafter, a test scenario being processed in S107 to S109 will be referred to as the "subject test scenario".

In step S108, the test scenario & input value generation unit 13 generates a test case (which may be referred to as "action") based on the subject test scenario, and the automatic screen operation unit 14 performs the test case on the subject screen. As a result, a screen transition occurs. Note that when the subject test scenario requires an input value, generation of a test input value is performed in step S108.

When steps S105 to S110 are performed with respect to all transition-destination screens (HTML) within the boundary of the upper limit value, the test asset generation unit 16 generates a screen transition diagram (S111). Specifically, the test asset generation unit 16 compares a generated screen transition information list with screen transitions actually occurring in steps S105 to S110, extracts (detects), if any, a screen transition that does not occur in the test, and generates a screen transition diagram that shows combined information on each screen transition that can be made and each screen transition that cannot be made. For the screen transition that cannot be made, since a test script has not been generated either, support such as creating a test script manually may be provided.

Subsequently, the test asset generation unit 16 outputs the test scenario and the test input value used when each screen transition occurs, in the test script format (S112).

(Example of Detailed Actions of the Client Apparatus 10)

Next, a description will be given of an example of detailed actions of the client apparatus 10, focusing on actions of first transitioning to the reference screen and then performing screen transitions within the boundary of the upper limit value of the number of hops.

Figure 7:
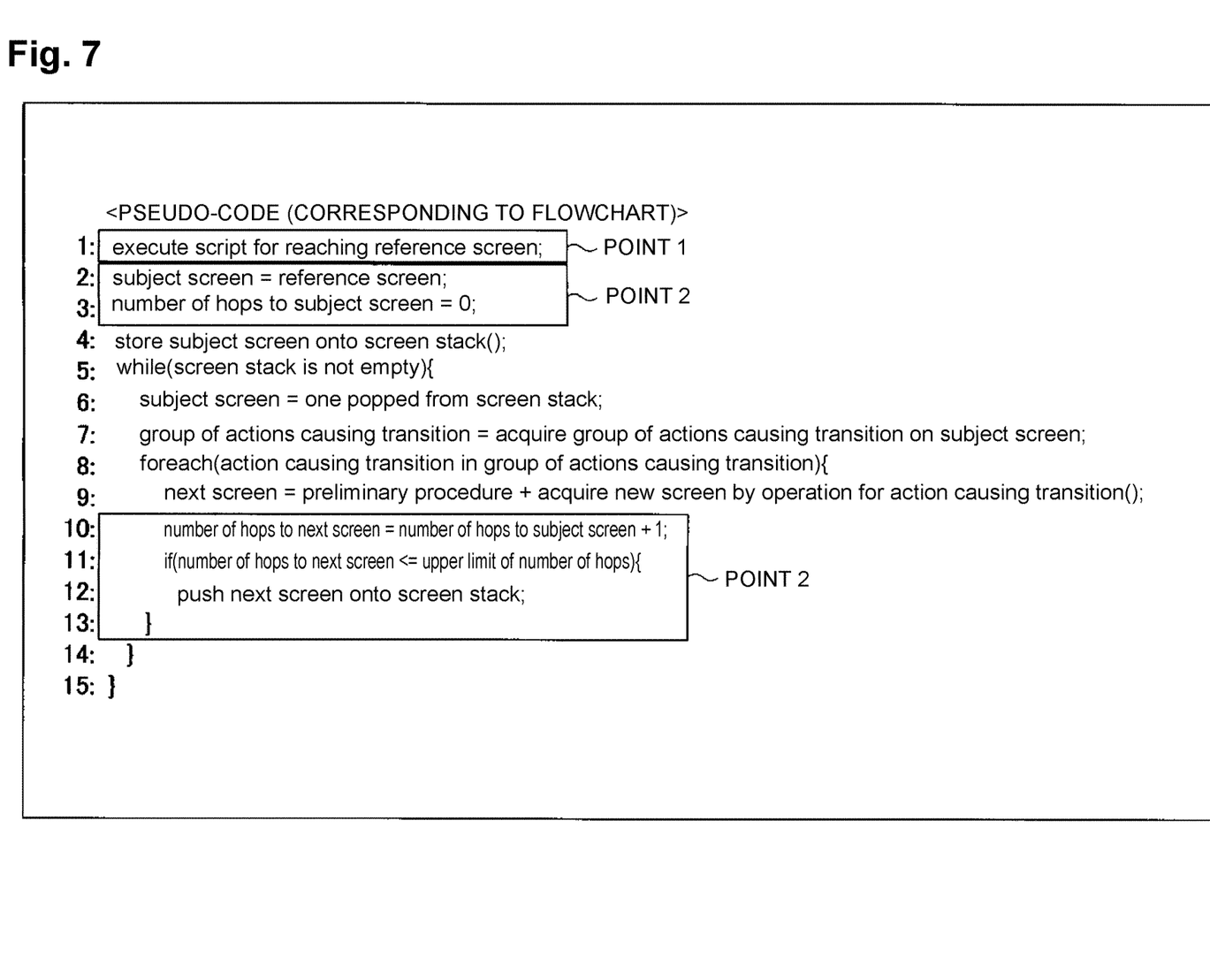
FIG. 7 is pseudo-code for describing an example of detailed actions of the client apparatus 10.

As mentioned earlier, the client apparatus 10 is a computer as shown in FIG. 4, and actions according to the present embodiment are implemented by the program being executed in the computer. Hereinafter, the example of the actions of the client apparatus 10 as a computer will be described based on pseudo-code (corresponding to the program running on the computer) shown in FIG. 7. Processing indicated by the pseudo-code in FIG. 7 substantially corresponds to S103 to S110 in FIG. 6. Moreover, FIG. 7 shows portions corresponding to the points 1, 2 shown in FIG. 2.

As described before, the client apparatus 10 receives, as inputs, the test script for a transition from the initial screen to the reference screen in the web application under test, the upper limit value of the number of screen transitions (the number of hops), and the like.

In the first line, the client apparatus 10 executes, on the web application under test, the test script for reaching the reference screen from the initial screen. The client apparatus 10 sets the reached reference screen as a subject screen, and sets the number of hops to the subject screen to "0" (the second and third lines). Hereinafter, it is assumed that a "screen" means data (HTML data and the like) for displaying the screen at the client apparatus 10.

In the fourth line, the client apparatus 10 stores the subject screen in a screen stack. The screen stack is a stack in which a transition-destination screen to be analyzed is stored, and is a first-in, first-out stack.

The fifth to fifteenth lines are executed unless the screen stack is empty. In the sixth line, the client apparatus 10 sets one screen popped off from the screen stack as a subsequent subject screen.

In the seventh line, the client apparatus 10 acquires a group of actions that cause a screen transition, from among elements on the subject screen. An action is, among the elements (input form, button, link, and the like) on the subject screen, a combination of an element such as the input form and an element causing a screen transition (button, link, or the like). When there are a plurality of elements causing a screen transition (button, link, and the like), a plurality of actions are acquired. Such a plurality of actions are referred to as a group of actions.

The eighth to fourteenth lines are executed for each action in the group of actions causing a transition on the subject screen. In the ninth line, after performing a preliminary procedure for transitioning to the subject screen, the client apparatus 10 performs an action of interest on the subject screen, acquires a new screen that is a transition destination, and sets the new screen as a next screen.

In the tenth line, the client apparatus 10 sets the number of hops to the next screen to "the number of hops to the subject screen+1".

In the eleventh line, the client apparatus 10 determines whether or not the number of hops to the next screen is equal to or smaller than the upper limit value of the number of hops, and pushes the next screen onto the screen stack in the twelfth line when the number of hops is equal to or smaller than the upper limit value. If the number of hops is larger than the upper limit value, the next screen is not pushed onto the screen stack.

After the processing in the eighth to fourteenth lines is performed for all actions in the group of actions with respect to the current subject screen, the processing returns to the fifth line, and the above-described processing is performed again unless the screen stack is empty.

In the above-described processing, the client apparatus 10 records, in a memory or the like, information obtained through the analysis, such as each action and information on a screen to which a transition is made by the action. The recorded information is used in generation of test scripts and the like that are outputted in the end.

Figure 8:
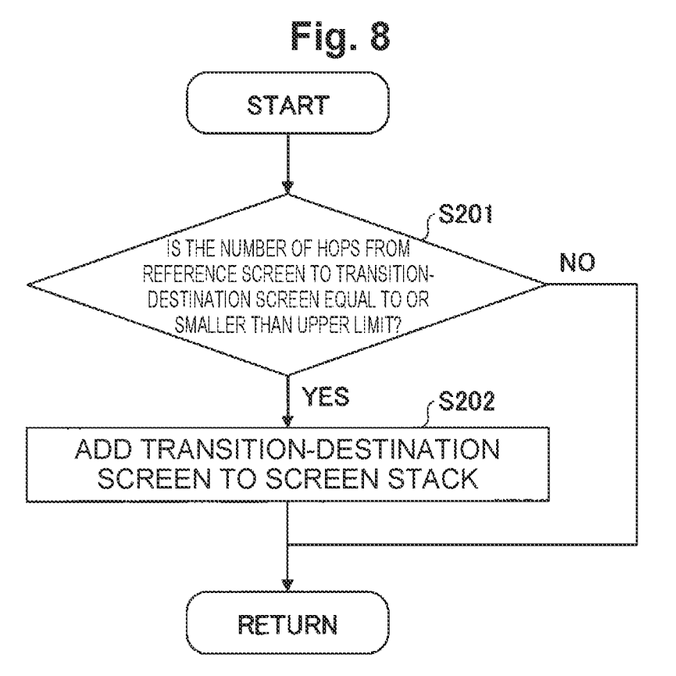
FIG. 8 is a flowchart showing processing by a number-of-hops determination unit 17.

FIG. 8 is a flowchart of processing related to determination as to the number of hops. In S201, the client apparatus 10 determines whether or not the number of hops from the reference screen to a transition-destination screen (the above-described next screen) is equal to or smaller than the upper limit value. When the number of hops is equal to or smaller than the upper limit value, the transition-destination screen is added to the screen stack in S202.

Note that the analysis method described with reference to FIG. 7 may be used for purposes other than automatic test script generation.

Advantageous Effect of the Embodiment

Regarding the problem with the existing reverse-based testing technique that specification reconstruction is performed even on a portion where an exhaustive screen transition is unnecessary, with the technique according to the above-described embodiment, a scope of specification reconstruction can be limited only to required screens, by using the test script for reaching the reference screen and by setting the upper limit to the number of screen transitions.

By reducing unnecessary specification reconstruction processing, an advantageous effect is obtained that time required for specification reconstruction can be greatly reduced.

Summary of the Embodiment

In the present embodiment, at least an analysis apparatus, an analysis method, and a program that are described in each following item are provided.
(First Item)
An analysis apparatus, including: script execution means for executing a script that causes a transition of a screen displayed by a web application, to a reference screen; and analysis means for performing screen transition analysis for the web application, within a boundary that the number of hops for screen transitions from the reference screen is equal to or smaller than a preset upper limit value.
(Second Item)
The analysis apparatus according to the first item, wherein the analysis means repeatedly performs an operation causing a screen transition, within the boundary that the number of hops for screen transitions from the reference screen is equal to or smaller than the upper limit value.
(Third Item)
The analysis apparatus according to the first or second item, wherein the analysis means performs processing of acquiring, as an action, an element causing a screen transition among elements on a subject screen of interest, and acquiring a next screen by performing an operation for the action on the subject screen of interest, in a repeated manner by setting the next screen as a new subject screen, within the boundary that the number of hops for screen transitions from the reference screen, which is a first subject screen, is equal to or smaller than the upper limit value.
(Fourth Item)
An analysis method performed by an analysis apparatus, including: a script execution step of executing a script that causes a transition of a screen displayed by a web application, to a reference screen; and an analysis step of performing screen transition analysis for the web application, within a boundary that the number of hops for screen transitions from the reference screen is equal to or smaller than a preset upper limit value.
(Fifth Item)
A program for causing a computer to function as each means in the analysis apparatus according to any one of the first to third items.

Although the present embodiment has been described hereinabove, the present invention is not limited to such a specific embodiment, and various modifications and changes can be made within the scope of the principles of the present invention defined by claims.

REFERENCE SIGNS LIST

10 Client apparatus
11 Screen transition information extraction unit
12 Test script execution unit
13 Test scenario & input value generation unit
14 Automatic screen operation unit
15 Screen evaluation unit
16 Test asset generation unit
17 Number-of-hops determination unit
20 Server apparatus
100 Drive device
101 Recording medium
102 Auxiliary storage device
103 Memory device
104 CPU
105 Interface device
106 Display device
107 Input device
B Bus

The invention claimed is:

1. An analysis method comprising:
receiving a script, wherein the script is based on a web application configured to render screens, the script describes an automatic transition from an initial screen of the web application to a first screen of interest of a plurality of screens of interest of the web application, and the plurality of screens of interest represents a boundary of testing the web application;
executing the script, causing the automatic transition from the initial screen to the first screen of interest of the plurality of screens of interest of the web application;
subsequent to the automatic transition to the first screen, automatically generating, as a screen transition analysis, based on a code of a controller of the web application configured to render the first screen of the web application, a combination of a test scenario of the first screen, input data of the first screen, and a screen transition from the first screen to a second screen of the plurality of screens of interest, wherein the screen transition analysis represents at least a part of performing specification reconstruction of a part of the web application, and the second screen is within the boundary based on a predetermined number of hops for screen transitions from the first screen;
dynamically updating, based on causing execution of the second code according to the test scenario and the screen transition, screen transition information of the web application; and
automatically generating, based on the test scenario and the screen transition information, a test script of the screen transition from the first screen to the second screen of the plurality of screens of interest as output for testing the web application.

2. The analysis method according to claim 1, wherein the screen transition analysis further comprises performing an operation causing a subsequent screen transition, within the boundary that a number of hops for screen transitions from the first screen is equal to or smaller than an upper limit value.

3. The analysis method according to claim 2, wherein the performing the screen transition analysis further comprises:
analyzing, at least as a part of an action according to the test scenario and the code of the controller of the web application, an element causing the subsequent screen transition among elements on a subject screen of interest; and
acquiring a next screen by performing an operation for the action on the subject screen of interest, in a repeated manner by setting the next screen as a new subject screen, within the boundary.

4. The analysis method according to claim 1, wherein the performing the screen transition analysis further comprises:

analyzing, at least as a part of an action according to the test scenario and the code of the controller of the web application, an element causing a subsequent screen transition among elements on a subject screen of interest; and acquiring a next screen by performing an operation for the action on the subject screen of interest, in a repeated manner by setting the next screen as a new subject screen, within the boundary that a number of hops for screen transitions from a reference screen, which is a first subject screen, is equal to or smaller than a upper limit value.

5. An analysis apparatus comprising a processor configured to execute operations comprising:

receiving a script, wherein the script is based on a web application configured to render screens, the script describes an automatic transition from an initial screen of the web application to a first screen of interest of a plurality of screens of interest of the web application, and the plurality of screens of interest represents a boundary of testing the web application;

executing the script, causing the automatic transition from the initial screen to the first screen of interest of the plurality of screens of interest of the web application;

subsequent to the automatic transition to the first screen, automatically generating, as a screen transition analysis, based on a code of a controller of the web application configured to render the first screen of the web application, a combination of a test scenario of the first screen, input data of the first screen, and a screen transition from the first screen to a second screen of the plurality of screens of interest, wherein the screen transition analysis represents at least a part of performing specification reconstruction of a part of the web application, and the second screen is within the boundary based on a predetermined number of hops for screen transitions from the first screen;

dynamically updating, based on causing execution of the second code according to the test scenario and the screen transition, screen transition information of the web application; and automatically generating, based on the test scenario and the screen transition information, a test script of the screen transition from the first screen to the second screen of the plurality of screens of interest as output for testing the web application.

6. The analysis apparatus according to claim 5, wherein the causing execution of the second code further comprises performing an operation causing a subsequent screen transition, within the boundary that a number of hops for screen transitions from the first screen is equal to or smaller than an upper limit value.

7. The analysis apparatus according to claim 6, the processor further configured to execute an operation comprising:

analyzing, at least as a part of an action according to the test scenario and the code of the controller of the web application, an element causing the subsequent screen transition among elements on a subject screen of interest; and acquiring a next screen by performing an operation for the action on the subject screen of interest, in a repeated manner by setting the next screen as a new subject screen, within the boundary that the number of hops for screen transitions from a reference screen, which is a first subject screen, is equal to or smaller than the upper limit value.

8. The analysis apparatus according to claim 5, wherein the performing the screen transition analysis further comprises:

analyzing, at least as a part of an action according to the test scenario and the code of the controller of the web application, an element causing the screen transition among elements on a subject screen of interest; and acquiring a next screen by performing an operation for the action on the subject screen of interest, in a repeated manner by setting the next screen as a new subject screen, within the boundary that a number of hops for screen transitions from a reference screen, which is a first subject screen, is equal to or smaller than an upper limit value.

9. A computer-readable non-transitory recording medium storing a computer-executable program instructions that when executed by a processor cause a computer system to execute an operation comprising:

receiving a script, wherein the script is based on a web application configured to render screens, the script describes an automatic transition from an initial screen of the web application to a first screen of interest of a plurality of screens of interest of the web application, and the plurality of screens of interest represents a boundary of testing the web application;

executing the script, causing the automatic transition from the initial screen to the first screen of interest of the plurality of screens of interest of the web application;

subsequent to the automatic transition to the first screen, automatically generating, as a screen transition analysis, based on a code of a controller of the web application configured to render the first screen of the web application, a combination of a test scenario of the first screen, input data of the first screen, and a screen transition from the first screen to a second screen of the plurality of screens of interest, wherein the screen transition analysis represents at least a part of performing specification reconstruction of a part of the web application, and the second screen is within the boundary based on a predetermined number of hops for screen transitions from the first screen;

dynamically updating, based on causing execution of the second code according to the test scenario and the screen transition, screen transition information of the web application; and automatically generating, based on the test scenario and the screen transition information, a test script of the screen transition from the first screen to the second screen of the plurality of screens of interest as output for testing the web application.

10. The computer-readable non-transitory recording medium of claim 9, wherein the screen transition analysis further comprises performing an operation causing a subsequent screen transition, within the boundary that a number of hops for screen transitions from the first screen is equal to or smaller than an upper limit value.

11. The computer-readable non-transitory recording medium of claim 10, wherein the performing the screen transition analysis further comprises:

analyzing, at least as a part of an action according to the test scenario and the code of the controller of the web application, an element causing the subsequent screen transition among elements on a subject screen of interest; and acquiring a next screen by performing an operation for the action on the subject screen of interest, in a repeated manner by setting the next screen as a new subject screen, within the boundary.

12. The computer-readable non-transitory recording medium of claim 9, wherein performing the screen transition analysis further comprises:
   analyzing, at least as a part of an action according to the test scenario and the code of the controller of the web application, an element causing a subsequent screen transition among elements on a subject screen of interest; and
   acquiring a next screen by performing an operation for the action on the subject screen of interest, in a repeated manner by setting the next screen as a new subject screen, within the boundary that a number of hops for screen transitions from a reference screen, which is a first subject screen, is equal to or smaller than an upper limit value.

\* \* \* \* \*